(No Model.)
M. T. BURKE.
HORSE COLLAR.
No. 471,600. Patented Mar. 29, 1892.
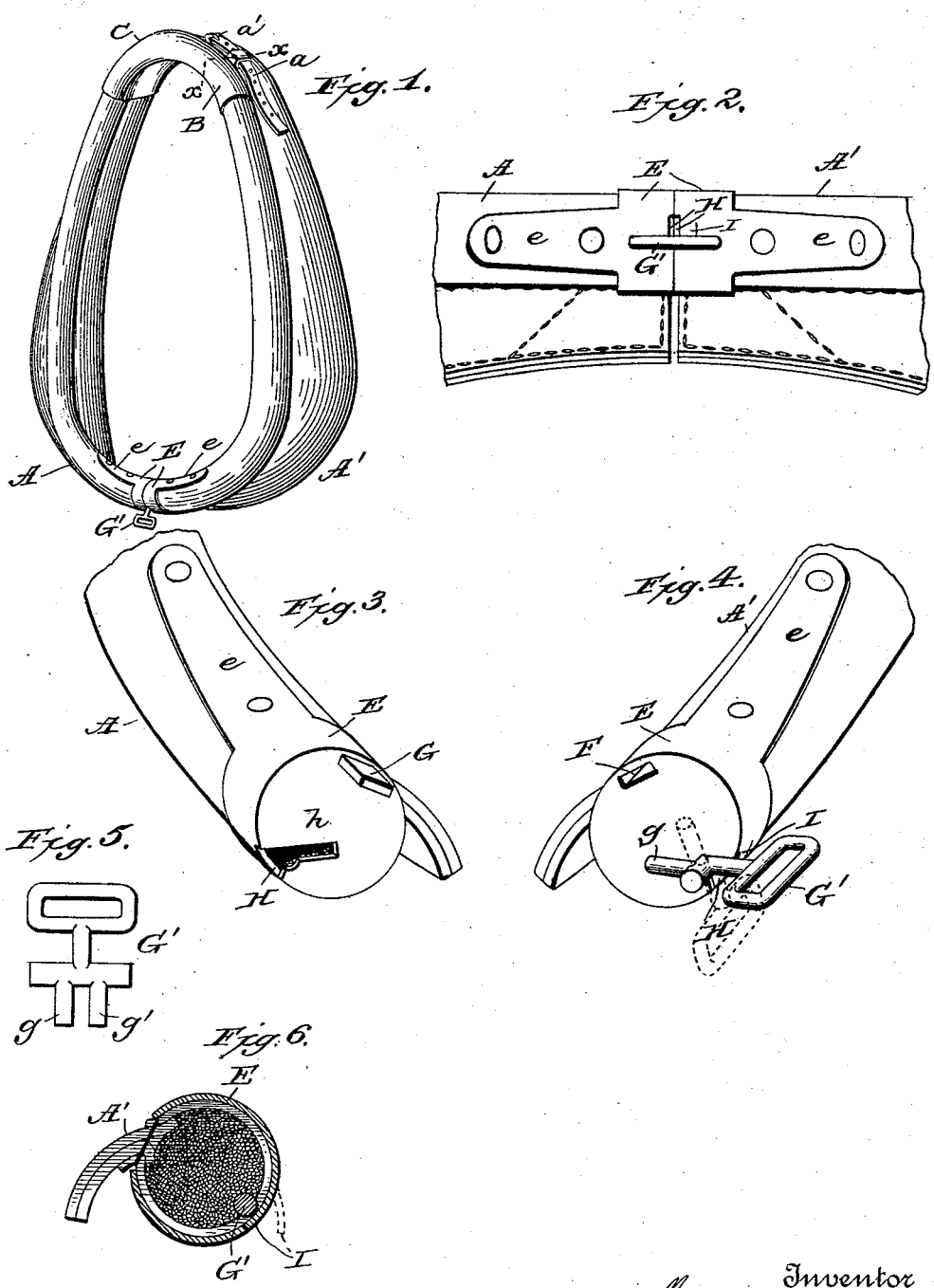

UNITED STATES PATENT OFFICE.

MELANCTHON T. BURKE, OF LA CROSSE, WISCONSIN, ASSIGNOR OF ONE-HALF TO EDWARD R. BURKE, OF SAME PLACE.

HORSE-COLLAR.

SPECIFICATION forming part of Letters Patent No. 471,600, dated March 29, 1892.

Application filed March 20, 1891. Serial No. 385,781. (No model.)

*To all whom it may concern:*

Be it known that I, MELANCTHON T. BURKE, of La Crosse, in the county of La Crosse and State of Wisconsin, have invented certain new and useful Improvements in Horse-Collars; and I do hereby declare the following to be a full, clear, and exact description of the same, reference being had to the accompanying drawings, forming a part of this specification, and to the letters of reference marked thereon.

This invention relates to improvements in horse-collars, and has for its object to provide a collar which, while made in separate halves, will be as rigid in the fore-wale or rim portion as though made in the ordinary manner and provided with the most approved devices to prevent contraction of the collar, at the same time permitting it to be readily adjusted to suit different-sized horses' necks within reasonable limits without impairing its efficiency.

The invention consists in certain novel details of construction and combinations and arrangements of parts to be hereinafter described, and pointed out particularly in the claims at the end of this specification.

Referring to the accompanying drawings, Figure 1 is a perspective view of a horse-collar constructed in accordance with my present invention. Fig. 2 is a front elevation of the mechanism for uniting the halves at the bottom. Fig. 3 is a detail perspective of the lower end of one half of the collar, and Fig. 4 is a corresponding view of the opposite half. Fig. 5 is a detail of the locking-lever. Fig. 6 is a section through the end of the collar carrying the locking-lever.

Similar letters of reference in the several figures indicate the same parts.

In carrying my invention into practice I form the collar in separate halves A A' either by cutting an ordinary collar through at the bottom or in any preferred manner, and at the top employ the ordinary strap and buckle $a\ a'$, mounted on the upper ends of the shoulder-pads to hold the ends together, said buckle and strap being supplemented, however, by a rigid metal collar-pad B, which passes beneath the collar and forms a smooth bearing-surface in the ordinary manner, but at the forward portion is curved up and over, forming a tubular socket C, which fits snugly around the upper ends of the fore-wale, the space between the edge of the socket and body of the pad being just sufficient for the passage of the seam between the fore-wale and shoulder-pad. This construction of collar-pad and socket forms a rigid connection for the upper ends of the collar, and as it is highly desirable that the fore-wale be in the form of a rigid solid frame conforming, approximately, to the shape of the horse's neck I have devised a mechanism for holding the lower ends in similar manner, which mechanism consists, essentially, of a socket E, which embraces only the fore-wale at the lower end of each collar half, said sockets being provided with flat abutting faces and long strengthening-straps $e$, lying along the outer and inner side of the fore-wale, and not in the hame-depression, as has heretofore been customary. On the rear side the sockets are each formed with openings or slots the edges of which are sufficiently separated to admit the seam in the collars as ordinarily constructed, but with which, it will be readily understood, a throatless collar may be employed without alteration, there being no socket nor other portion adapted to fit around the lower ends of the collar-pad.

In the face of one of the sockets, and preferably at the rear portion thereof, as shown in Fig. 4, is a recess F for the reception of a corresponding pin G on the opposite socket. These recesses and pins are so positioned as that when the devices are in place they will lie outside of the leather forming the collar-covering and preferably just at the point where the seam between the fore-wale and collar-pad is formed, at which point the leather may be easily pushed aside when the sockets are put in position. Thus no opening into the body of the end of the collar is necessary, and the straw or stuffing cannot escape.

Diametrically opposite the pin and recess or on the lower front portion of the socket I secure the locking-lever, which is a simple casting. (Shown in Fig. 5.) Both sockets at the point mentioned have recesses H formed therein for the reception of the body of the locking-lever, and in one a further opening or recess $h$ is formed, which passes through the face-plate and is adapted for the passage of the projection $g$ on the locking-lever G' when turned up, and it will be readily understood that after said projection has passed through the opening and the lever turned down the projection passes around inside of the face-plate and cannot be withdrawn. The opposite socket is not provided with a recess $h$, but in lieu thereof provision is made for inserting the end of the locking-lever and holding the same permanently in place with the projection $g'$ behind the face-plate. To accomplish this, I preferably form a tongue I in the outer wall of the socket which when the locking-lever is inserted is bent down over the body of the same and thereafter prevents its escape, as will be readily understood by those skilled in the art, though the tongue could be dispensed with, if desired. The outer portion of the locking-lever is preferably formed into a loop, through which the martingale-strap passes, and when held down by said strap is in locked position. Hence there is little or no liability of the device becoming unlocked while in use, even though the hames should not hold the halves of the collar together squarely. By locating the locking-lever at the front of the sockets and the pin and recess at the back of the same it will be seen that not only is lateral play absolutely prevented, but any looseness in a direction induced by the opening or closing of the upper portion of the collar is prevented. It will be further noticed that the fastening projection of the locking-lever projects to a point about central of the cap, and hence there is little or no tendency for the caps to separate at either edge. Hence in some instances it is entirely practicable to leave the pin and its socket off entirely.

Having thus described my invention, what I claim as new is—

1. The combination, with the collar divided at the bottom and the sockets secured on the ends of the fore-wale and provided with face-plates having openings therein, of the locking-lever journaled in one of said openings and having the projection adapted to enter the opposite opening and pass in behind the face-plate when the lever is moved, substantially as described.

2. The combination, with the collar divided at the bottom and the sockets secured on the ends of the fore-wale and provided with face-plates having openings therein, of the locking-lever journaled in one of said openings and having the two projections, as described, and the tongue on the socket bent down over the lever to hold the same permanently in place, substantially as described.

3. In the herein-described fastening device, the combination, with the sockets for the collar ends, having the face-plates with openings therein, the pin and its co-operating recess opposite the same, of the locking-lever journaled in one of the openings and having the projection entering the opposite opening and adapted to be turned in behind the face-plate and the tongue bent down over the locking-lever to hold the same in its bearings, substantially as described.

MELANCTHON T. BURKE.

Witnesses:
ALEX. S. STEUART,
THOMAS DURANT.